(12) United States Patent
Zhang et al.

(10) Patent No.: US 12,009,490 B2
(45) Date of Patent: Jun. 11, 2024

(54) METHOD AND APPARATUS FOR DETERMINING STATUS OF BATTERY TEMPERATURE SENSOR, MEDIUM, VEHICLE, AND SERVER

(71) Applicant: NIO TECHNOLOGY (ANHUI) CO., LTD, Hefei (CN)

(72) Inventors: Peng Zhang, Anhui (CN); Huaidong Tang, Anhui (CN); Xudong Zhang, Anhui (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 225 days.

(21) Appl. No.: 17/507,364

(22) Filed: Oct. 21, 2021

(65) Prior Publication Data

US 2022/0131203 A1 Apr. 28, 2022

(30) Foreign Application Priority Data

Oct. 23, 2020 (CN) .......................... 202011145140.X (51) Int. Cl.
*H01M 10/48* (2006.01)
(52) U.S. Cl.
CPC ...... *H01M 10/486* (2013.01); *H01M 2220/20* (2013.01)
(58) Field of Classification Search
None
See application file for complete search history.

(56) References Cited

U.S. PATENT DOCUMENTS

2011/0246105 A1 10/2011 Ley et al.
2014/0376587 A1 12/2014 Sakashita et al.
(Continued)

FOREIGN PATENT DOCUMENTS

CN 105698970 6/2016

OTHER PUBLICATIONS

Hassan et al., ("Statistical scheme for fault detection using Arduino and MPU 6050," 2019 Prognostics and System Health Management Conference (PHM-Qingdao), Qingdao, China, 2019, pp. 1-7 (Year: 2019).*

(Continued)

*Primary Examiner* — Roy Y Yi
(74) *Attorney, Agent, or Firm* — Sheridan Ross P.C.

(57) ABSTRACT

This application relates to a method and an apparatus for determining a status of a battery temperature sensor, a medium, a vehicle, and a server. The method includes: receiving reading statistics of a temperature sensor that are collected at intervals of a predetermined time in a stable vehicle working condition, where the reading statistics include a highest temperature reading and a lowest temperature reading of the temperature sensor within each predetermined time; determining a highest temperature reading trend, a lowest temperature reading trend, and a largest temperature reading difference in the stable vehicle working condition based on the highest temperature reading and the lowest temperature reading; and determining a status of the temperature sensor based on the highest temperature reading trend, the lowest temperature reading trend, and the largest temperature reading difference. The method is capable of accurately determining whether a battery temperature sensor is anomalous.

20 Claims, 5 Drawing Sheets

(56) References Cited

U.S. PATENT DOCUMENTS

| | | | |
|---|---|---|---|
| 2015/0132615 A1 | 5/2015 | Yun | |
| 2016/0091374 A1* | 3/2016 | Kim | H01M 10/486 |
| | | | 429/90 |
| 2018/0348071 A1* | 12/2018 | Guo | G01K 13/02 |

OTHER PUBLICATIONS

Extended Search Report for European Patent Application No. 21204009.1, dated Mar. 16, 2022, 9 pages.

* cited by examiner

METHOD AND APPARATUS FOR DETERMINING STATUS OF BATTERY TEMPERATURE SENSOR, MEDIUM, VEHICLE, AND SERVER

CROSS-REFERENCE TO RELATED APPLICATION

This application claims the benefit of China Patent Application No. 202011145140.X filed Oct. 23, 2020, the entire contents of which are incorporated herein by reference in its entirety.

TECHNICAL FIELD

This application relates to the field of vehicle sensors, and specifically, to a method and an apparatus for determining a status of a battery temperature sensor, a computer-readable storage medium, a vehicle, and a battery management server.

BACKGROUND ART

In contrast with the rapid promotion of electric vehicles in recent years, batteries as the heart for traction are frequently face fires, explosions and other problems that seriously affect social security. Temperature is one of the core indexes of batteries. Whether a battery is used in a safe state depends on whether a temperature sensor can work normally. Therefore, finding an anomaly of the sensor in time is of great significance to safe use of the battery.

Although the temperature sensor has gone through strict reliability tests during production and installation, changes in voltage and temperature may still cause a fault to the sensor. As electric vehicles are an emerging industry, there is currently no good method capable of detecting a battery temperature sensor on an electric vehicle.

SUMMARY OF THE INVENTION

Embodiments of this application provide a method and an apparatus for determining a status of a battery temperature sensor, a computer-readable storage medium, a vehicle, and a battery management server, to accurately determine whether a battery temperature sensor is anomalous, thereby troubleshooting problems in time and eliminating potential safety hazards in use of electric vehicle batteries.

According to an aspect of this application, a method for determining a status of a battery temperature sensor is provided, including: receiving reading statistics of a temperature sensor that are collected at intervals of a predetermined time in a stable vehicle working condition, where the reading statistics include a highest temperature reading and a lowest temperature reading of the temperature sensor within each predetermined time; determining a highest temperature reading trend, a lowest temperature reading trend, and a largest temperature reading difference in the stable vehicle working condition based on the highest temperature reading and the lowest temperature reading; and determining a status of the temperature sensor based on the highest temperature reading trend, the lowest temperature reading trend, and the largest temperature reading difference.

In some embodiments of this application, optionally, the predetermined time is 5 s.

In some embodiments of this application, optionally, the stable vehicle working condition is a vehicle driving condition or a vehicle charging condition.

In some embodiments of this application, optionally, the vehicle driving condition is any time period in a process from the start to the end of a vehicle trip, and the vehicle charging condition is any time period in a process from the start to the end of vehicle charging.

In some embodiments of this application, optionally, the status includes: normal, anomalous, or pending.

In some embodiments of this application, optionally, the method includes: determining an accumulated highest temperature reading difference and an accumulated lowest temperature reading difference in the stable vehicle working condition based on the highest temperature readings and the lowest temperature readings in adjacent predetermined times, where the accumulated highest temperature reading difference is a sum of absolute values of differences between the highest temperature readings in the adjacent predetermined times, and the accumulated lowest temperature reading difference is a sum of absolute values of differences between the lowest temperature readings in the adjacent predetermined times.

In some embodiments of this application, optionally, the method includes: if the accumulated lowest temperature reading difference exceeds N times of the accumulated highest temperature reading difference, and the largest temperature reading difference is greater than a first preset temperature difference, determining that the temperature sensor is anomalous, where N is greater than 1.5.

In some embodiments of this application, optionally, the method includes: if the accumulated lowest temperature reading difference exceeds N times of the accumulated highest temperature reading difference, or the largest temperature reading difference is greater than a first preset temperature difference, determining that the temperature sensor is pending, where N is greater than 1.5.

In some embodiments of this application, optionally, N=2.

In some embodiments of this application, optionally, N is determined based on statistics on a battery temperature sensor whose status is known.

In some embodiments of this application, optionally, the method includes: issuing an alarm if it is determined that the temperature sensor is in an anomalous state.

According to another aspect of this application, a computer-readable storage medium is provided, where the computer-readable storage medium stores instructions, and the instructions, when executed by a processor, cause the processor to perform any one of the foregoing methods.

According to another aspect of this application, an apparatus for determining a status of a battery temperature sensor is provided, including: a communications module configured to receive reading statistics of a temperature sensor that are collected at intervals of a predetermined time in a stable vehicle working condition, where the reading statistics include a highest temperature reading and a lowest temperature reading of the temperature sensor within each predetermined time; a calculation module configured to determine a highest temperature reading trend, a lowest temperature reading trend, and a largest temperature reading difference in the stable vehicle working condition based on the highest temperature reading and the lowest temperature reading; and a determining module configured to determine a status of the temperature sensor based on the highest temperature reading trend, the lowest temperature reading trend, and the largest temperature reading difference.

In some embodiments of this application, optionally, the predetermined time is 5 s.

In some embodiments of this application, optionally, the stable vehicle working condition is a vehicle driving condition or a vehicle charging condition.

In some embodiments of this application, optionally, the vehicle driving condition is any time period in a process from the start to the end of a vehicle trip, and the vehicle charging condition is any time period in a process from the start to the end of vehicle charging.

In some embodiments of this application, optionally, the status includes: normal, anomalous, or pending.

In some embodiments of this application, optionally, the calculation module is configured to determine an accumulated highest temperature reading difference and an accumulated lowest temperature reading difference in the stable vehicle working condition based on the highest temperature readings and the lowest temperature readings in adjacent predetermined times, where the accumulated highest temperature reading difference is a sum of absolute values of differences between the highest temperature readings in the adjacent predetermined times, and the accumulated lowest temperature reading difference is a sum of absolute values of differences between the lowest temperature readings in the adjacent predetermined times; and the determining module is configured to determine the status of the temperature sensor based on the accumulated highest temperature reading difference, the accumulated lowest temperature reading difference, and the largest temperature reading difference.

In some embodiments of this application, optionally, if the determining module determines that the accumulated lowest temperature reading difference exceeds N times of the accumulated highest temperature reading difference, and the largest temperature reading difference is greater than a first preset temperature difference, the determining module determines that the temperature sensor is anomalous, where N is greater than 1.5.

In some embodiments of this application, optionally, if the determining module determines that the accumulated lowest temperature reading difference exceeds N times of the accumulated highest temperature reading difference, or the largest temperature reading difference is greater than a first preset temperature difference, the determining module determines that the temperature sensor is pending, where N is greater than 1.5.

In some embodiments of this application, optionally, N=2.

In some embodiments of this application, optionally, the apparatus further includes a statistics collection module configured to determine a value of N based on statistics on a battery temperature sensor whose status is known.

In some embodiments of this application, optionally, the apparatus further includes an alarm module configured to issue an alarm when the determining module determines that the temperature sensor is in an anomalous state.

According to another aspect of this application, a vehicle is provided, including any one of the foregoing apparatuses for determining a status of a battery temperature sensor.

According to another aspect of this application, a battery management server is provided, including any one of the foregoing apparatuses for determining a status of a battery temperature sensor.

BRIEF DESCRIPTION OF THE DRAWINGS

The above and other objectives and advantages of this application will be more thorough and clearer from the following detailed description in conjunction with the drawings, where the same or similar elements are represented by the same reference numerals.

DETAILED DESCRIPTION OF EMBODIMENTS

For the sake of brevity and illustrative purposes, the principles of this application are mainly described herein with reference to its exemplary embodiments. However, persons skilled in the art can easily appreciate that the same principle can be equivalently applied to all types of methods and apparatuses for determining a status of a battery temperature sensor, computer-readable storage media, vehicles, and battery management servers, and a same or similar principle can be implemented. These variations do not depart from the true spirit and scope of this application.

The following embodiments are to provide a mechanism for determining a sensor fault based on battery highest and lowest temperature trends, and a temperature difference. This mechanism is capable of determining a status of a sensor nearly in real time.

Statistics of received readings are recorded in this application. However, in some cases, a sensor does not need to collect actual statistics on data, but send only actually collected temperature readings (at sampling moments). In this case, a receiving side may include a step/module for collecting statistics on the data at predetermined intervals in advance. It may be considered that the statistics of received readings recorded herein are from the step/module.

Figure 1:
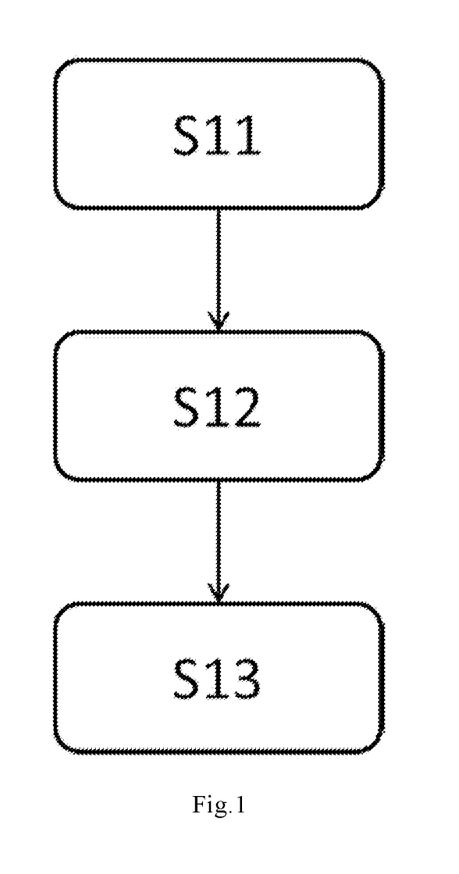
FIG. 1 shows a method for determining a status of a battery temperature sensor according to an embodiment of this application.

According to an aspect of this application, a method for determining a status of a battery temperature sensor is provided. As shown in FIG. 1, the method includes the following steps: In step S11, a highest temperature reading and a lowest temperature reading of a temperature sensor that are reported in a stable vehicle working condition are received; in step S12, a highest temperature reading trend, a lowest temperature reading trend, and a largest temperature reading difference in the stable vehicle working condition are determined based on the highest temperature reading and the lowest temperature reading; and in step S13, a status of the temperature sensor is determined based on the highest temperature reading trend, the lowest temperature reading trend, and the largest temperature reading difference.

According to the method for determining a status of a battery temperature sensor, reading statistics of the temperature sensor that are collected at intervals of a predetermined time in the stable vehicle working condition are received in step S11, where the reading statistics include a highest temperature reading and a lowest temperature reading of the temperature sensor within each predetermined time. Although the invention is mainly focused on temperature sensors of vehicle batteries, the basic principle of the invention is also applicable to temperature sensors in other scenarios.

Temperature changes of a battery may be inconsistent in an unstable working condition, which affects a reading change trend of a sensor. Therefore, performance of the sensor when the vehicle is in a stable working condition may be used to evaluate whether the sensor works normally. As an example, the stable working condition may be a single working condition. In some embodiments of this application, the stable vehicle working condition may be a vehicle driving condition or a vehicle charging condition. In other examples, the stable working condition may be a hybrid working condition. For example, the stable working condition includes a low-speed vehicle driving condition and a vehicle slow-charging condition. The stable working condition in the invention refers to a single or hybrid working condition that does not cause drastic changes in battery temperature. A specific scenario of the stable working condition may be determined based on experiments or theory.

In some embodiments of this application, the vehicle driving condition is any time period in a process from the start to the end of a vehicle trip, and the vehicle charging condition is any time period in a process from the start to the end of vehicle charging. In this application, the stable working condition does not need to meet specified duration, provided that the status of the sensor can be determined based on analysis of data in the stable working condition. In a case that the stable working condition is a single working condition, the vehicle driving condition may be any time period in a process from the start to the end of a vehicle trip, or a constant-speed or approximately constant-speed process in the vehicle trip. In a constant-speed cruise process, battery temperature is more stable, which facilitates determining of a status of a sensor. A fault may occur when values measured by the sensor change drastically. In addition, the vehicle charging condition as the stable working condition is any time period in a process from the start to the end of vehicle charging, or may be the end stage of the charging process. This stage is "trickle" charging, and battery temperature is relatively stable, which facilitates determining of a status of a sensor.

Figure 5:
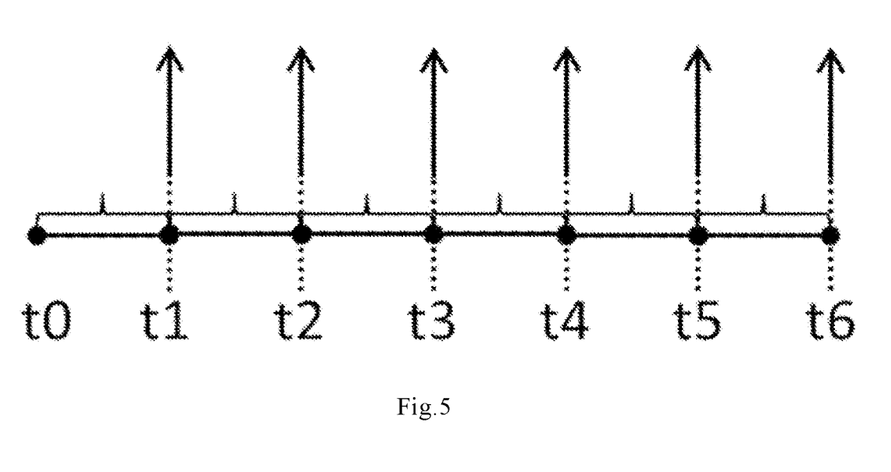
FIG. 5 shows a schematic diagram of a principle for determining a status of a battery temperature sensor according to an embodiment of this application.

Generally, battery temperature may be read at specific time intervals, and the time interval depends on actual requirements or hardware condition limitations. In some embodiments of this application, readings of the sensor are obtained at intervals of a 5-second predetermined time. A sampling time of the sensor may be much less than the 5-second predetermined time. Therefore, statistics of the readings of the sensor (namely, statistics of sampling values) may be specifically collected within this period of time. The statistics of the readings include the highest temperature reading and the lowest temperature reading of the temperature sensor within each predetermined time. FIG. 5 shows how to receive statistics of readings of a temperature sensor in a predetermined time. As shown in the figure, an interval between moment t0 and moment t1 is 5 s; an interval between moment t1 and moment t2 is 5 s; and other cases can be deduced by analogy. Statistics of readings of the temperature sensor in the time period from t0 to t1 (including the highest temperature reading and the lowest temperature reading in this time period) are received at moment t1; statistics of readings of the temperature sensor in the time period from t1 to t2 (including the highest temperature reading and the lowest temperature reading in this time period) are received at moment t2; and other cases can be deduced by analogy.

According to the method for determining a status of a battery temperature sensor, the highest temperature reading trend, the lowest temperature reading trend, and the largest temperature reading difference in the stable vehicle working condition are determined based on the highest temperature reading and the lowest temperature reading in step S12. Because the data received in step S11 is reported in a real-time or quasi real-time manner, values in the stable vehicle working condition are accumulated continuously. In step S12, the highest temperature reading trend, the lowest temperature reading trend, and the largest temperature reading difference may be calculated based on the accumulated data. It should be understood that, with the accumulation of received data, calculated values are updated continuously.

The highest temperature reading trend and the lowest temperature reading trend in the invention are specifically quantitative values, arrays, matrices, or the like that reflect trends of or a correlation between the highest temperature reading and the lowest temperature reading. For example, the highest temperature reading trend and the lowest temperature reading trend may be slopes reflecting curves of the highest temperature reading and the lowest temperature reading versus time, respectively. If a difference between the slopes keeps departing (for example, the difference between the slopes is greater than a predetermined value within a period of time), the two trends may be inconsistent. For another example, the highest temperature reading trend and the lowest temperature reading trend may be a correlation coefficient between the highest temperature reading and the lowest temperature reading. In this case, the highest temperature reading trend and the lowest temperature reading trend may be a same value (namely, the correlation coefficient).

In addition, the invention is also focused on the largest temperature reading difference in the stable vehicle working condition. Still referring to FIG. 5, if the highest temperature reading between moment t0 and moment t1 is TH0, and the lowest temperature reading is TL0, a temperature reading difference in this period of time is D0=TH0−TL0; if the highest temperature reading between moment t1 and moment t2 is TH1 and the lowest temperature reading is TL1, a temperature reading difference in this period of time is D1=TH1−TL1; and other cases can be deduced by analogy. Finally, values of D0, D1, . . . are compared, and the largest value is used as the largest temperature reading difference in the stable vehicle working condition. The largest temperature reading difference may also be used as an index reflecting whether the sensor is anomalous.

According to the method for determining a status of a battery temperature sensor, the status of the temperature sensor is determined based on the highest temperature reading trend, the lowest temperature reading trend, and the largest temperature reading difference in step S13. As described above, the highest temperature reading trend, the lowest temperature reading trend, and the largest temperature reading difference may be used as indexes for evaluating whether the sensor is anomalous. In this application, whether the temperature sensor is anomalous is determined based on all of the highest temperature reading trend, the lowest temperature reading trend, and the largest temperature reading difference.

In some embodiments of this application, the status of the sensor may specifically include normal, anomalous, or pending. When all of the highest temperature reading trend, the lowest temperature reading trend, and the largest temperature reading difference indicate that the reading of the sensor is normal, it may be considered that the sensor is in a normal state. When all of the highest temperature reading trend, the lowest temperature reading trend, and the largest temperature reading difference indicate that the reading of the sensor is improper, it may be considered that the sensor is in an anomalous state. In other cases, if it cannot be determined that the sensor is in a normal state or in an anomalous state, it may be considered that the sensor is in a pending state. To further determine whether the sensor in the pending state is anomalous, more data needs to be received for observation.

In some embodiments of this application, the method for determining a status of a battery temperature sensor in this application further includes: determining an accumulated highest temperature reading difference and an accumulated lowest temperature reading difference in the stable vehicle working condition based on the highest temperature readings and the lowest temperature readings in adjacent predetermined times, where the accumulated highest temperature reading difference is a sum of absolute values of differences between the highest temperature readings in the adjacent predetermined times, and the accumulated lowest temperature reading difference is a sum of absolute values of differences between the lowest temperature readings in the adjacent predetermined times. In this case, the highest temperature reading trend and the lowest temperature reading trend that are determined in step S12 are reflected by the accumulated highest temperature reading difference and the accumulated lowest temperature reading difference.

Figure 3:
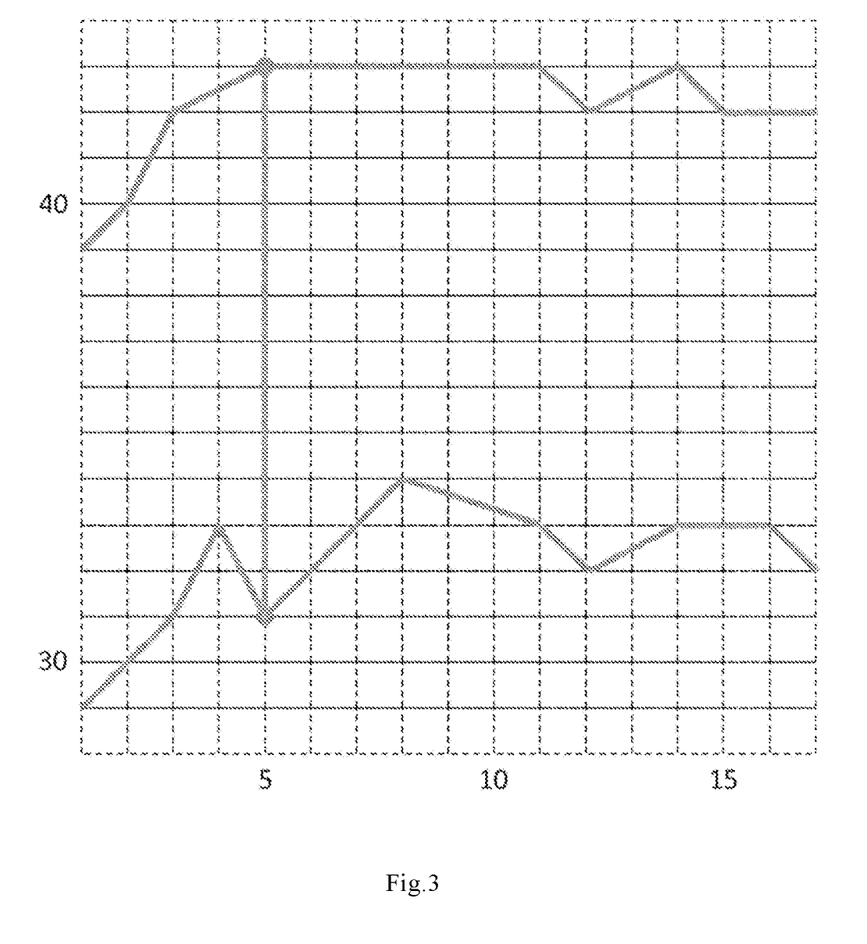
FIG. 3 shows a schematic diagram of a principle for determining a status of a battery temperature sensor according to an embodiment of this application.

As shown in FIG. 3, the upper curve represents a curve of the highest temperature reading versus time, and the lower curve represents a curve of the lowest temperature reading versus time. If ($T_{high}$, t) (in which $T_{high}$ denotes a value of the highest temperature reading, and t denotes a moment) is used to represent values at points in the graph, the curve of the highest temperature reading versus time may be represented as follows:

(39° C., 1)-(40° C., 2)-(42° C., 3)-(42.5° C., 4)-(43° C., 5)-(43° C., 6)-(43° C., 7)-(43° C., 8)-(43° C., 9)-(43° C., 10)-(43° C., 11)-(42° C., 12)-(42.5° C., 13)-(43° C., 14)-(42° C., 15)-(42° C., 16)-(42° C., 17). At this time (moment 17), the accumulated highest temperature reading difference is:
|40−39|+|42−40|+|42.5−42|+|43−42.5|+|43−43|+|43−43|+|43−43|+|43−43|+|43−43|+|43−43|+|42−43|+|42.5−42|+|43−42.5|+|42−43|+|42−42|+|42−42|=7° C.

If ($T_{low}$, t) (in which $T_{low}$ denotes a value of the lowest temperature reading, and t denotes a moment) is used to represent values at points in the graph, the curve of the lowest temperature reading versus time may be represented as follows:

(29° C., 1)-(30° C., 2)-(31° C., 3)-(33° C., 4)-(31° C., 5)-(32° C., 6)-(33° C., 7)-(34° C., 8)-(33.7° C., 9)-(33.3° C., 10)-(33° C., 11)-(32° C., 12)-(32.5° C., 13)-(33° C., 14)-(33° C., 15)-(33° C., 16)-(32° C., 17). At this time (moment 17), the accumulated lowest temperature reading difference is:
|30−29|+|31−30|+|33−31|+|31−33|+|32−31|+|33−32|+|34−33|+|33.7−34|+|33.3−33.7|+|33−33.3|+|32−33|+|32.5−32|+|33−32.5|+|33−33|+|33−33|+|32−33|=13° C.

The accumulated highest temperature reading difference and the accumulated lowest temperature reading difference reflect fluctuations of the highest temperature reading and the lowest temperature reading over time. Generally, the closer the accumulated highest temperature reading difference and the accumulated lowest temperature reading difference, the closer the fluctuations of the highest temperature reading and the lowest temperature reading, and the closer the trends of the highest temperature reading and the lowest temperature reading may be.

In some embodiments of this application, the method for determining a status of a battery temperature sensor in this application further includes: if the accumulated lowest temperature reading difference exceeds N times of the accumulated highest temperature reading difference, and the largest temperature reading difference is greater than a first preset temperature difference, determining that the temperature sensor is anomalous, where N is greater than 1.5 (for example, N=2).

Figure 4:
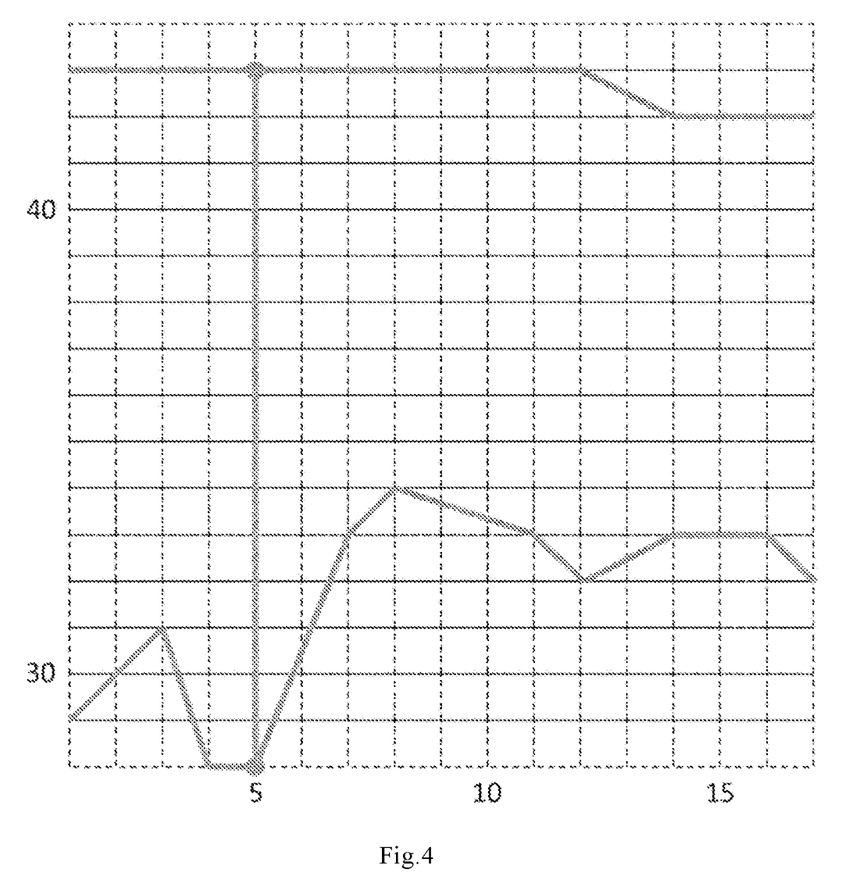
FIG. 4 shows a schematic diagram of a principle for determining a status of a battery temperature sensor according to an embodiment of this application.

Turning to FIG. 4, the upper curve represents a curve of the highest temperature reading versus time, and the lower curve represents a curve of the lowest temperature reading versus time. If ($T_{high}$, t) (in which $T_{high}$ denotes a value of the highest temperature reading, and t denotes a moment) is used to represent values at points in the graph, the curve of the highest temperature reading versus time may be represented as follows:

(43° C., 1)-(43° C., 2)-(43° C., 3)-(43° C., 4)-(43° C., 5)-(43° C., 6)-(43° C., 7)-(43° C., 8)-(43° C., 9)-(43° C., 10)-(43° C., 11)-(43° C., 12)-(42.5° C., 13)-(42° C., 14)-(42° C., 15)-(42° C., 16)-(42° C., 17). At this time (moment 17), the accumulated highest temperature reading difference is:
|43−43|+|43−43|+|43−43|+|43−43|+|43−43|+|43−43|+|43−43|+|43−43|+|43−43|+|43−43|+|43−43|+|42.5−43|+|42−42.5|+|42−42|+|42−42|+|42−42|=1° C.

If ($T_{low}$, t) (in which $T_{low}$ denotes a value of the lowest temperature reading, and t denotes a moment) is used to represent values at points in the graph, the curve of the lowest temperature reading versus time may be represented as follows:

(29° C., 1)-(30° C., 2)-(31° C., 3)-(28° C., 4)-(28° C., 5)-(30.5° C., 6)-(33° C., 7)-(34° C., 8)-(33.7° C., 9)-(33.3° C., 10)-(33° C., 11)-(32° C., 12)-(32.5° C., 13)-(33° C., 14)-(33° C., 15)-(33° C., 16)-(32° C., 17). At this time (moment 17), the accumulated lowest temperature reading difference is:
|30−29|+|31−30|+|28−31|+|28−28|+|30.5−28|+|33−30.5|+|34−33|+|33.7−34|+|33.3−33.7|+|33−33.3|+|32−33|+|32.5−32|+|33−32.5|+|33−33|+|33−33|+|32−33|=15° C.

In this case, 15° C.>1° C.*2, and the condition that the accumulated lowest temperature reading difference exceeds N times of the accumulated highest temperature reading difference (N=2) is met. In an example corresponding to FIG. 3, 13° C.<7° C.*2, and the condition that the accumulated lowest temperature reading difference exceeds N times of the accumulated highest temperature reading difference (N=2) is not met.

In the example corresponding to FIG. 3, the largest temperature reading difference occurs at moment 5, and is 12° C. In an example corresponding to FIG. 4, the largest temperature reading difference also occurs at moment 5, and is 15° C. If the first preset temperature difference is 10° C., both the foregoing two values meet this condition.

The example corresponding to FIG. 4 meets both the following conditions: (1) the accumulated lowest temperature reading difference exceeds N times of the accumulated highest temperature reading difference (N=2); and (2) the largest temperature reading difference is greater than the first preset temperature difference 10° C. In this case, it may be determined that the temperature sensor is in an anomalous state.

In some embodiments of this application, the method for determining a status of a battery temperature sensor in this application further includes: if the accumulated lowest temperature reading difference exceeds N times of the accumulated highest temperature reading difference, or the largest temperature reading difference is greater than a first preset temperature difference, determining that the temperature sensor is pending, where N is greater than 1.5 (for example, N=2).

The example corresponding to FIG. 3 does not meet condition (1) that the accumulated lowest temperature reading difference exceeds N times of the accumulated highest temperature reading difference (N=2), but meets condition (2) that the largest temperature reading difference is greater than the first preset temperature difference 10° C. In this case, it may be determined that the temperature sensor is in a pending state.

In other examples, if the accumulated lowest temperature reading difference is less than N times of the accumulated highest temperature reading difference (N=1.4), and the largest temperature reading difference is less than the first preset temperature difference (for example, 7° C.), it may be determined that the temperature sensor is in a normal state.

Although N may be 2 is in an example given above based on experience, in some embodiments of this application, N may be determined based on statistics on a battery temperature sensor whose status is known. For example, battery temperature may be measured in a stable working condition based on a battery temperature sensor whose normal state is known; the accumulated highest temperature reading difference and accumulated lowest temperature reading difference are calculated in a manner described above; and a proper value of N may be derived from the differences. It should be noted that different N values may be set for different batches, models, and ages of batteries; and a value of N may be set based on expected, similar, or identical batches, models, and ages of batteries.

In some embodiments of this application, the method for determining a status of a battery temperature sensor in this application further includes: issuing an alarm if it is determined that the temperature sensor is in an anomalous state. If the sensor is anomalous, battery temperature cannot be accurately measured, which causes safety hazards. Therefore, an alarm needs to be issued to prompt drivers, managers and the like when it is determined that the sensor is anomalous.

Figure 2:
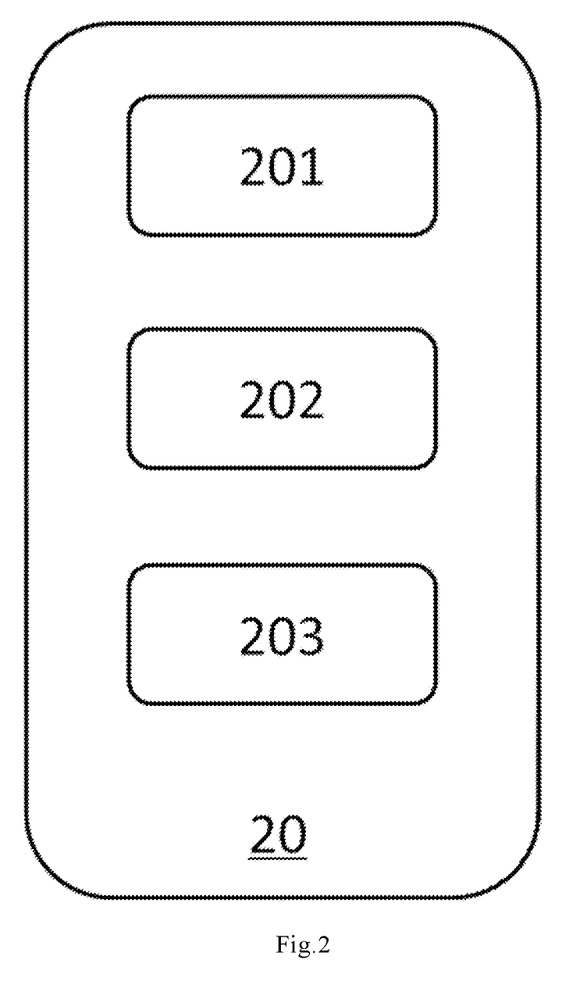
FIG. 2 shows an apparatus for determining a status of a battery temperature sensor according to an embodiment of this application.

According to another aspect of this application, an apparatus for determining a status of a battery temperature sensor is provided. As shown in FIG. 2, the apparatus 20 includes a communications module 201, a calculation module 202, and a determining module 203. The communications module 201 is configured to receive reading statistics of a temperature sensor that are collected at intervals of a predetermined time in a stable vehicle working condition, where the reading statistics include a highest temperature reading and a lowest temperature reading of the temperature sensor within each predetermined time. Although the invention is mainly focused on temperature sensors of vehicle batteries, the apparatus 20 of the invention is also applicable to temperature sensors in other scenarios.

Temperature changes of a battery may be inconsistent in an unstable working condition, which affects a reading change trend of a sensor. Therefore, performance of the sensor when the vehicle is in a stable working condition may be used to evaluate whether the sensor works normally. As an example, the stable working condition may be a single working condition. In some embodiments of this application, the stable vehicle working condition may be a vehicle driving condition or a vehicle charging condition. In other examples, the stable working condition may be a hybrid working condition. For example, the stable working condition includes a low-speed vehicle driving condition and a vehicle slow-charging condition. The stable working condition in the invention refers to a single or hybrid working condition that does not cause drastic changes in battery temperature. A specific scenario of the stable working condition may be determined based on experiments or theory.

In some embodiments of this application, the vehicle driving condition is any time period in a process from the start to the end of a vehicle trip, and the vehicle charging condition is any time period in a process from the start to the end of vehicle charging. In this application, the stable working condition does not need to meet specified duration, provided that the status of the sensor can be determined based on analysis of data in the stable working condition. In a case that the stable working condition is a single working condition, the vehicle driving condition may be any time period in a process from the start to the end of a vehicle trip, or a constant-speed or approximately constant-speed process in the vehicle trip. In a constant-speed cruise process, battery temperature is more stable, which facilitates determining of a status of a sensor. A fault may occur when values measured by the sensor change drastically. In addition, the vehicle charging condition as the stable working condition is any time period in a process from the start to the end of vehicle charging, or may be the end stage of the charging process. This stage is "trickle" charging, and battery temperature is relatively stable, which facilitates determining of a status of a sensor.

Generally, battery temperature may be read at specific time intervals, and the time interval depends on actual requirements or hardware condition limitations. In some embodiments of this application, readings of the sensor are obtained at intervals of a 5-second predetermined time. A sampling time of the sensor may be much less than the 5-second predetermined time. Therefore, statistics of the readings of the sensor (namely, statistics of sampling values) may be specifically collected within this period of time. The statistics of the readings include the highest temperature reading and the lowest temperature reading of the temperature sensor within each predetermined time. FIG. 5 shows how to receive statistics of readings of a temperature sensor in a predetermined time. As shown in the figure, an interval between moment t0 and moment t1 is 5 s; an interval between moment t1 and moment t2 is 5 s; and other cases can be deduced by analogy. Statistics of readings of the temperature sensor in the time period from t0 to t1 (including the highest temperature reading and the lowest temperature reading in this time period) are received at moment t1; statistics of readings of the temperature sensor in the time period from t1 to t2 (including the highest temperature reading and the lowest temperature reading in this time period) are received at moment t2; and other cases can be deduced by analogy.

The calculation module 202 is configured to determine a highest temperature reading trend, a lowest temperature reading trend, and a largest temperature reading difference in the stable vehicle working condition based on the highest temperature reading and the lowest temperature reading. Because the data received by the communications module 201 is reported in a real-time or quasi real-time manner, values in the stable vehicle working condition are accumulated continuously. The calculation module 202 may calculate the highest temperature reading trend, the lowest temperature reading trend, and the largest temperature reading difference based on the accumulated data. It should be understood that, with the accumulation of received data, calculated values are updated continuously.

The highest temperature reading trend and the lowest temperature reading trend in the invention are specifically quantitative values, arrays, matrices, or the like that reflect trends of or a correlation between the highest temperature reading and the lowest temperature reading. For example, the highest temperature reading trend and the lowest temperature reading trend may be slopes reflecting curves of the highest temperature reading and the lowest temperature reading versus time, respectively. If a difference between the slopes keeps departing (for example, the difference between the slopes is greater than a predetermined value within a period of time), the two trends may be inconsistent. For another example, the highest temperature reading trend and the lowest temperature reading trend may be a correlation coefficient between the highest temperature reading and the lowest temperature reading. In this case, the highest temperature reading trend and the lowest temperature reading trend may be a same value (namely, the correlation coefficient).

In addition, the invention is also focused on the largest temperature reading difference in the stable vehicle working condition. Still referring to FIG. 5, if the highest temperature reading between moment t0 and moment t1 is TH0, and the lowest temperature reading is TL0, a temperature reading difference in this period of time is D0=TH0-TL0; if the highest temperature reading between moment t1 and moment t2 is TH1 and the lowest temperature reading is TL1, a temperature reading difference in this period of time is D1=TH1-TL1; and other cases can be deduced by analogy. Finally, values of D0, D1, . . . are compared, and the largest value is used as the largest temperature reading difference in the stable vehicle working condition. The largest temperature reading difference may also be used as an index reflecting whether the sensor is anomalous.

The determining module 203 is configured to determine a status of the temperature sensor based on the highest temperature reading trend, the lowest temperature reading trend, and the largest temperature reading difference. As described above, the highest temperature reading trend, the lowest temperature reading trend, and the largest temperature reading difference may be used as indexes for evaluating whether the sensor is anomalous. In this application, the determining module 203 determines, based on all of the highest temperature reading trend, the lowest temperature reading trend, and the largest temperature reading difference, whether the temperature sensor is anomalous.

In some embodiments of this application, the status of the sensor may specifically include: normal, anomalous, or pending. When all of the highest temperature reading trend, the lowest temperature reading trend, and the largest temperature reading difference indicate that the reading of the sensor is normal, it may be considered that the sensor is in a normal state. When all of the highest temperature reading trend, the lowest temperature reading trend, and the largest temperature reading difference indicate that the reading of the sensor is improper, it may be considered that the sensor is in an anomalous state. In other cases, if it cannot be determined that the sensor is in a normal state or in an anomalous state, it may be considered that the sensor is in a pending state. To further determine whether the sensor in the pending state is anomalous, more data needs to be received for observation.

In some embodiments of this application, the calculation module 202 is configured to calculate an accumulated highest temperature reading difference and an accumulated lowest temperature reading difference in the stable vehicle working condition based on the highest temperature readings and the lowest temperature readings in adjacent predetermined times, where the accumulated highest temperature reading difference is a sum of absolute values of differences between the highest temperature readings in the adjacent predetermined times, and the accumulated lowest temperature reading difference is a sum of absolute values of differences between the lowest temperature readings in the adjacent predetermined times. In this case, the highest temperature reading trend and the lowest temperature reading trend that are determined by the calculation module 202 in the above are reflected by the accumulated highest temperature reading difference and the accumulated lowest temperature reading difference. The determining module 203 is configured to further determine the status of the temperature sensor based on the accumulated highest temperature reading difference, the accumulated lowest temperature reading difference, and the largest temperature reading difference.

As shown in FIG. 3, the upper curve represents a curve of the highest temperature reading versus time, and the lower curve represents a curve of the lowest temperature reading versus time. If ($T_{high}$, t) (in which $T_{high}$ denotes a value of the highest temperature reading, and t denotes a moment) is used to represent values at points in the graph, the curve of the highest temperature reading versus time may be represented as follows:

(39° C., 1)-(40° C., 2)-(42° C., 3)-(42.5° C., 4)-(43° C., 5)-(43° C., 6)-(43° C., 7)-(43° C., 8)-(43° C., 9)-(43° C., 10)-(43° C., 11)-(42° C., 12)-(42.5° C., 13)-(43° C., 14)-(42° C., 15)-(42° C., 16)-(42° C., 17). At this time (moment 17), the calculation module 202 may determine that the accumulated highest temperature reading difference is:

|40−39|+|42−40|+|42.5−42|+|43−42.5|+|43−43|+|43−43|+|43−43|+|43−43|+|43−43|+|43−43|+|42−43|+|42.5−42|+|43−42.5|+|42−43|+|42−42|+|42−42|=7° C.

If ($T_{low}$, t) (in which $T_{low}$ denotes a value of the lowest temperature reading, and t denotes a moment) is used to represent values at points in the graph, the curve of the lowest temperature reading versus time may be represented as follows:

(29° C., 1)-(30° C., 2)-(31° C., 3)-(33° C., 4)-(31° C., 5)-(32° C., 6)-(33° C., 7)-(34° C., 8)-(33.7° C., 9)-(33.3° C., 10)-(33° C., 11)-(32° C., 12)-(32.5° C., 13)-(33° C., 14)-(33° C., 15)-(33° C., 16)-(32° C., 17). At this time (moment 17), the calculation module 202 may determine that the accumulated lowest temperature reading difference is:

|30−29|+|31−30|+|33−31|+|31−33|+|32−31|+|33−32|+|34−33|+|33.7−34|+|33.3−33.7|+|33−33.3|+|32−33|+|32.5−32|+|33−32.5|+|33−33|+|33−33|+|32−33|=13° C.

The accumulated highest temperature reading difference and the accumulated lowest temperature reading difference reflect fluctuations of the highest temperature reading and the lowest temperature reading over time. Generally, the closer the accumulated highest temperature reading difference and the accumulated lowest temperature reading difference, the closer the fluctuations of the highest temperature reading and the lowest temperature reading, and the closer the trends of the highest temperature reading and the lowest temperature reading may be.

In some embodiments of this application, if the determining module 203 determines that the accumulated lowest temperature reading difference exceeds N times of the accumulated highest temperature reading difference, and the largest temperature reading difference is greater than a first preset temperature difference, the determining module 203 determines that the temperature sensor is anomalous, where N is greater than 1.5 (for example, N=2).

Turning to FIG. 4, the upper curve represents a curve of the highest temperature reading versus time, and the lower curve represents a curve of the lowest temperature reading versus time. If ($T_{high}$, t) (in which $T_{high}$ denotes a value of the highest temperature reading, and t denotes a moment) is used to represent values at points in the graph, the curve of the highest temperature reading versus time may be represented as follows:

(43° C., 1)-(43° C., 2)-(43° C., 3)-(43° C., 4)-(43° C., 5)-(43° C., 6)-(43° C., 7)-(43° C., 8)-(43° C., 9)-(43° C., 10)-(43° C., 11)-(43° C., 12)-(42.5° C., 13)-(42° C., 14)-(42° C., 15)-(42° C., 16)-(42° C., 17). At this time (moment 17), the calculation module 202 may determine that the accumulated highest temperature reading difference is:

|43−43|+|43−43|+|43−43|+|43−43|+|43−43|+|43−43|+|43−43|+|43−43|+|43−43|+|43−43|+|43−43|+|42.5−43|+|42−42.5|+|42−42|+|42−42|+|42−42|=1° C.

If ($T_{low}$, t) (in which $T_{low}$ denotes a value of the lowest temperature reading, and t denotes a moment) is used to represent values at points in the graph, the curve of the lowest temperature reading versus time may be represented as follows:

(29° C., 1)-(30° C., 2)-(31° C., 3)-(28° C., 4)-(28° C., 5)-(30.5° C., 6)-(33° C., 7)-(34° C., 8)-(33.7° C., 9)-(33.3° C., 10)-(33° C., 11)-(32° C., 12)-(32.5° C., 13)-(33° C., 14)-(33° C., 15)-(33° C., 16)-(32° C., 17). At this time (moment 17), the calculation module 202 may determine that the accumulated lowest temperature reading difference is:

|30−29|+|31−30|+|28−31|+|28−28|+|30.5−28|+|33−30.5|+|34−33|+|33.7−34|+|33.3−33.7|+|33−33.3|+|32−33|+|32.5−32|+|33−32.5|+|33−33|+|33−33|+|32−33|=15° C.

In this case, 15° C.>1° C.*2, and the determining module 203 may determine that the condition that the accumulated lowest temperature reading difference exceeds N times of the accumulated highest temperature reading difference (N=2) is met. In an example corresponding to FIG. 3, 13° C.<7° C.*2, and the determining module 203 may determine that the condition that the condition that the accumulated lowest temperature reading difference exceeds N times of the accumulated highest temperature reading difference (N=2) is not met.

In the example corresponding to FIG. 3, the largest temperature reading difference occurs at moment 5, and is 12° C. In an example corresponding to FIG. 4, the largest temperature reading difference also occurs at moment 5, and is 15° C. If the first preset temperature difference is 10° C., the determining module 203 may determine that both the foregoing two values meet this condition.

The determining module 203 may determine that the example corresponding to FIG. 4 meets both the following conditions: (1) the accumulated lowest temperature reading difference exceeds N times of the accumulated highest temperature reading difference (N=2); and (2) the largest temperature reading difference is greater than the first preset temperature difference 10° C. In this case, the determining module 203 may determine that the temperature sensor is in an anomalous state.

In some embodiments of this application, if the determining module 203 determines that the accumulated lowest temperature reading difference exceeds N times of the accumulated highest temperature reading difference, or the largest temperature reading difference is greater than a first preset temperature difference, the determining module 203 determines that the temperature sensor is pending, where N is greater than 1.5 (for example, N=2).

The determining module 203 may determine that the example corresponding to FIG. 3 does not meet condition (1) that the accumulated lowest temperature reading difference exceeds N times of the accumulated highest temperature reading difference (N=2), but meets condition (2) that the largest temperature reading difference is greater than the first preset temperature difference 10° C. In this case, the determining module 203 may determine that the temperature sensor is in a pending state.

In other examples, if the determining module 203 may determine that the accumulated lowest temperature reading difference is less than N times of the accumulated highest temperature reading difference (N=1.4), and the largest temperature reading difference is less than the first preset temperature difference (for example, 7° C.), the determining module 203 may determine that the temperature sensor is in a normal state.

In some embodiments of this application, the apparatus 20 further includes a statistics collection module (not shown in the figure). The statistics collection module is configured to determine a value of N based on statistics on a battery temperature sensor whose status is known. For example, battery temperature may be measured in a stable working condition based on a battery temperature sensor whose normal state is known; the accumulated highest temperature reading difference and accumulated lowest temperature reading difference are calculated in a manner described above; and a proper value of N may be derived from the differences. It should be noted that different N values may be set for different batches, models, and ages of batteries; and a value of N may be set based on expected, similar, or identical batches, models, and ages of batteries. In some examples, the statistics collection module determines a proper value of N based on machine learning, without taking a batch, model, age, and other attributes of a sample battery into consideration.

In some embodiments of this application, the apparatus 20 further includes an alarm module (not shown in the figure). The alarm module is configured to issue an alarm when the determining module 203 determines that the temperature sensor is in an anomalous state. If the sensor is anomalous, battery temperature cannot be accurately measured, which causes safety hazards. Therefore, the alarm module may issue an alarm to prompt drivers, managers and the like when it is determined that the sensor is anomalous.

According to another aspect of this application, a vehicle is provided, including any one of the foregoing apparatuses for determining a status of a battery temperature sensor. The apparatus for determining a status of a battery temperature sensor may be an onboard apparatus, which has a local processing capability and may determine a status of a sensor locally in the vehicle. Preloading such a device on the vehicle endows the vehicle with an offline processing capability. Therefore, the vehicle can determine a status of a sensor by its own hardware.

According to another aspect of this application, a battery management server is provided, including any one of the foregoing apparatuses for determining a status of a battery temperature sensor. The apparatus for determining a status of a battery temperature sensor may be a cloud device that can be embedded into an existing cloud system (server or array) by a vehicle manufacturer or battery service provider. A vehicle periodically uploads battery signal data to cloud in charging and driving processes. The cloud system stores the data in a data warehouse for analysis and use. The apparatus for determining a status of a battery temperature sensor may determine a status of a sensor based on data that is of the sensor and that is collected by the cloud system.

According to another aspect of this application, a computer-readable storage medium is provided. The computer-readable storage medium stores instructions, and the instructions, when executed by a processor, cause the processor to perform any one of the foregoing methods for determining a status of a battery temperature sensor. The computer-readable storage medium in this application includes various computer storage media, and may be any usable medium accessible to a general-purpose or special-purpose computer. For example, the computer-readable storage medium may include a RAM, a ROM, an EPROM, an E²PROM, a register, a hard disk, a removable hard disk, a CD-ROM or another optical memory, a magnetic disk memory or another magnetic storage device, or any other transitory or non-transitory media that can carry or store expected program code having an instruction or data structure form and be accessible to the general-purpose or special-purpose computer or a general-purpose or special-purpose processor. Data is usually copied magnetically in a disk used in this specification, while data is usually copied optically by using lasers in a disc. A combination thereof shall also fall within the protection scope of computer-readable media. For example, the storage medium is coupled to a processor, so that the processor can read data from and write data to the storage medium. In an alternative solution, the storage medium may be integrated into the processor. The processor and the storage medium may reside in an ASIC. The ASIC may reside in a user terminal. In an alternative solution, the processor and the storage medium may reside as discrete assemblies in a user terminal.

The foregoing descriptions are merely the embodiments of this application, but are not intended to limit the protection scope of this application. Any feasible variation or replacement figured out by a person skilled in the art within the technical scope disclosed in this application shall fall within the protection scope of this application. In the case of no conflict, the embodiments of this application and features in the embodiments may be combined with each other. The protection scope of this application shall be subject to the protection scope of the claims.

What is claimed:

1. A method for determining a status of a battery temperature sensor, comprising:
    receiving reading statistics of a temperature sensor that are collected at intervals of a predetermined time in a stable vehicle working condition, wherein the reading statistics comprise a highest temperature reading and a lowest temperature reading of the temperature sensor within each predetermined time;
    determining a highest temperature reading trend, a lowest temperature reading trend, and a largest temperature reading difference in the stable vehicle working condition based on the highest temperature reading and the lowest temperature reading; and
    determining a status of the temperature sensor based on the highest temperature reading trend, the lowest temperature reading trend, and the largest temperature reading difference.

2. The method according to claim 1, wherein the stable vehicle working condition is a vehicle driving condition or a vehicle charging condition.

3. The method according to claim 2, wherein the vehicle driving condition is any time period in a process from the start to the end of a vehicle trip, and the vehicle charging condition is any time period in a process from the start to the end of vehicle charging.

4. The method according to claim 1, wherein the status comprises: normal, anomalous, or pending.

5. The method according to claim 4, wherein the method comprises: determining an accumulated highest temperature reading difference and an accumulated lowest temperature reading difference in the stable vehicle working condition based on the highest temperature readings and the lowest temperature readings in adjacent predetermined times, wherein the accumulated highest temperature reading difference is a sum of absolute values of differences between the highest temperature readings in the adjacent predetermined times, and the accumulated lowest temperature reading difference is a sum of absolute values of differences between the lowest temperature readings in the adjacent predetermined times.

6. The method according to claim 5, wherein the method comprises: if the accumulated lowest temperature reading difference exceeds N times of the accumulated highest temperature reading difference, and the largest temperature reading difference is greater than a first preset temperature difference, determining that the temperature sensor is anomalous, wherein N is greater than 1.5.

7. The method according to claim 5, wherein the method comprises: if the accumulated lowest temperature reading difference exceeds N times of the accumulated highest temperature reading difference, or the largest temperature reading difference is greater than a first preset temperature difference, determining that the temperature sensor is pending, wherein Nis greater than 1.5.

8. The method according to claim 6, wherein N=2.

9. The method according to claim 6, wherein N is determined based on statistics on a battery temperature sensor whose status is known.

10. The method according to claim 4, wherein the method comprises: issuing an alarm if it is determined that the temperature sensor is in an anomalous state.

11. An apparatus for determining a status of a battery temperature sensor, comprising:
    a communications module configured to receive reading statistics of a temperature sensor that are collected at intervals of a predetermined time in a stable vehicle working condition, wherein the reading statistics comprise a highest temperature reading and a lowest temperature reading of the temperature sensor within each predetermined time;
    a calculation module configured to determine a highest temperature reading trend, a lowest temperature reading trend, and a largest temperature reading difference in the stable vehicle working condition based on the highest temperature reading and the lowest temperature reading; and
    a determining module configured to determine a status of the temperature sensor based on the highest temperature reading trend, the lowest temperature reading trend, and the largest temperature reading difference.

12. The apparatus according to claim 11, wherein the stable vehicle working condition is a vehicle driving condition or a vehicle charging condition.

13. The apparatus according to claim 12, wherein the vehicle driving condition is any time period in a process from the start to the end of a vehicle trip, and the vehicle charging condition is any time period in a process from the start to the end of vehicle charging.

14. The apparatus according to claim 11, wherein the status comprises: normal, anomalous, or pending.

15. The apparatus according to claim 14, wherein the calculation module is configured to determine an accumulated highest temperature reading difference and an accumulated lowest temperature reading difference in the stable vehicle working condition based on the highest temperature readings and the lowest temperature readings in adjacent predetermined times, wherein
- the accumulated highest temperature reading difference is a sum of absolute values of differences between the highest temperature readings in the adjacent predetermined times, and the accumulated lowest temperature reading difference is a sum of absolute values of differences between the lowest temperature readings in the adjacent predetermined times; and
- the determining module is configured to determine the status of the temperature sensor based on the accumulated highest temperature reading difference, the accumulated lowest temperature reading difference, and the largest temperature reading difference.

16. The apparatus according to claim 15, wherein if the determining module determines that the accumulated lowest temperature reading difference exceeds N times of the accumulated highest temperature reading difference, and the largest temperature reading difference is greater than a first preset temperature difference, the determining module determines that the temperature sensor is anomalous, wherein N is greater than 1.5.

17. The apparatus according to claim 15, wherein if the determining module determines that the accumulated lowest temperature reading difference exceeds N times of the accumulated highest temperature reading difference, or the largest temperature reading difference is greater than a first preset temperature difference, the determining module determines that the temperature sensor is pending, wherein N is greater than 1.5.

18. The apparatus according to claim 16, wherein the apparatus further comprises a statistics collection module configured to determine a value of N based on statistics on a battery temperature sensor whose status is known.

19. The apparatus according to claim 15, wherein the apparatus further comprises an alarm module configured to issue an alarm when the determining module determines that the temperature sensor is in an anomalous state.

20. A vehicle, wherein the vehicle comprises an apparatus for determining a status of a battery temperature sensor, the apparatus comprising:
- a communications module configured to receive reading statistics of a temperature sensor that are collected at intervals of a predetermined time in a stable vehicle working condition, wherein the reading statistics comprise a highest temperature reading and a lowest temperature reading of the temperature sensor within each predetermined time;
- a calculation module configured to determine a highest temperature reading trend, a lowest temperature reading trend, and a largest temperature reading difference in the stable vehicle working condition based on the highest temperature reading and the lowest temperature reading; and
- a determining module configured to determine a status of the temperature sensor based on the highest temperature reading trend, the lowest temperature reading trend, and the largest temperature reading difference.

* * * * *

UNITED STATES PATENT AND TRADEMARK OFFICE
CERTIFICATE OF CORRECTION

PATENT NO. : 12,009,490 B2
APPLICATION NO. : 17/507364
DATED : June 11, 2024
INVENTOR(S) : Peng Zhang et al.

Page 1 of 1

It is certified that error appears in the above-identified patent and that said Letters Patent is hereby corrected as shown below:

In the Claims

In Claim 7, Column 16, Line 33, delete "Nis", and insert --N is--

Signed and Sealed this
Eleventh Day of March, 2025

Coke Morgan Stewart
*Acting Director of the United States Patent and Trademark Office*